Sept. 6, 1960   F. A. KENT   2,951,308
FISH LURE
Filed Sept. 28, 1959
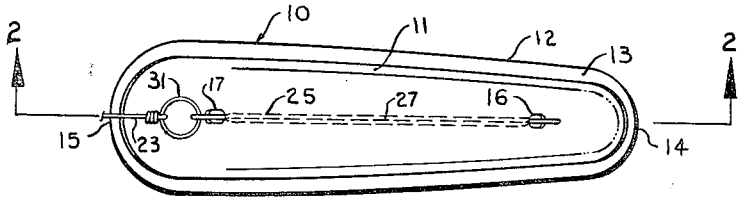
FIG. 1
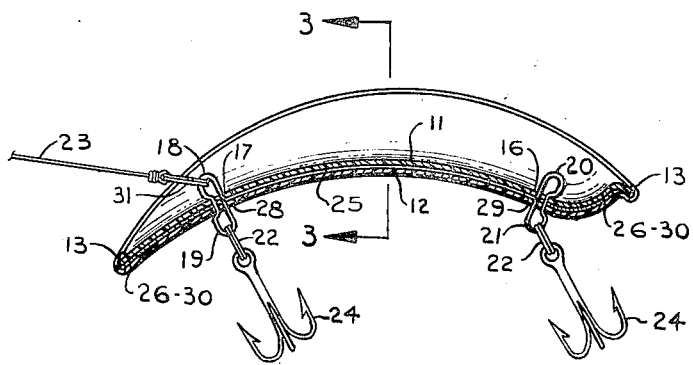
FIG. 2
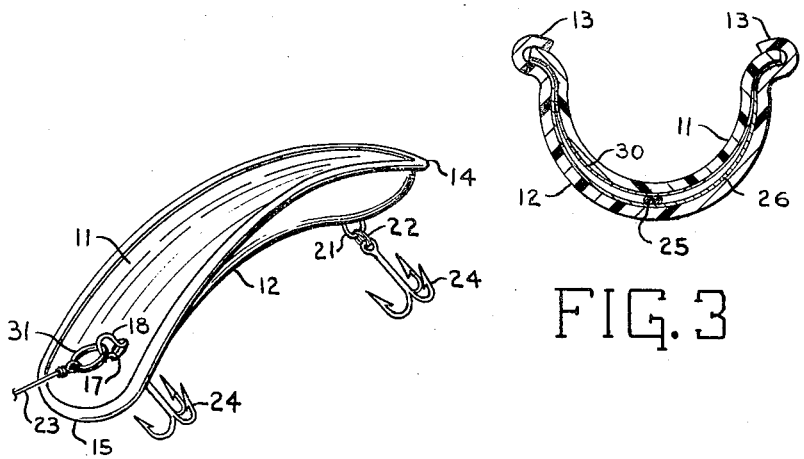
FIG. 3
FIG. 4
INVENTOR.
Frank A. Kent 2,951,308
FISH LURE Frank A. Kent, 21209 Huntington, Harper Woods, Mich.

Filed Sept. 28, 1959, Ser. No. 843,018

1 Claim. (Cl. 43—42.33)

This invention relates to an artificial fish lure used in trolling or casting for fish. Most important device of a fish lure is how are the fish hooks and fishing line or leader fastened to a fish lure. Some have eye bolts, or loop members with attached fish hooks and an eye bolt or loop member to attach to a fishing line or leader. These eye bolts or loop members are screwed in or moulded into the fish lure separately, which sometimes become loose from the fish lure when the fish strike or when the fish is pulled in.

Therefore the principal object of this invention is to provide a fish lure that has means for securing one or more fish hooks to a wire harness, said wire harness is fastened to a fishing line or leader, and the body of the fish lure is attached to the wire harness.

Another object of this invention is to provide a fish lure that is light in weight but lends itself to submersion in the water very slowly as it is propelled through the water.

A further object of this invention, is to provide a fish lure of this character, which is very simple in assembly, construction and readily manufactured.

All objects of this invention will become apparent from the following description and claim taken in connection with the drawing.

Figure 1 is a top plan view of the structure illustrated in Fig. 1.

Figure 2 is a longitudinal sectional view taken on line 2—2, Figure 1.

Figure 3 is an enlarged cross sectional view taken on line 3—3, Figure 2.

Figure 4 is a perspective view of the fish lure constructed in accordance with this invention.

Referring to the drawing, the fish lure is designated at 10 Figure 1 and comprised of two convexo-concave sectional shape and longitudinally curved segments 11—12 Figures 1-2-3-4. Each of these said segments 11—12 are formed from flat individual, uniform thickness, developed blanks, of transparent clear or colored plastic material such as Lucite or any other equally applicable material.

The inner segment 11 as shown in Figures 1-2-3 and 4 has the forward end substantially flat and arched, constituting a head 15 as shown in the drawing Figure 1 and Figure 4, convexo-concave shape as shown in the cross sectional view Figure 3; longitudinally curved and tapering longitudinally in the direction of the partial spherical shaped tail 14 Figures 1 and 4, the convex surface of the said inner segment 11 fits into the concave surface of the outer segment 12 Figure 2.

The outer segment 12 Figure 2 has the forward end substantially flat and arched constituting a head 15 as shown in the drawing Figure 1 and Figure 4, convexo-concave shape as shown in the cross sectional view Figure 3, longitudinally curved and tapering longitudinally in the direction of the partial spherical shaped tail 14 Figures 1 and 4. Said outer segment 12 is formed so that the convex surface of the inner segment 11 fits into the concave surface of the said outer segment 12, and is provided with a continuous flange 13 Figures 1-2 and 3 on the outer edge of the said outer segment 12. The flange 13 Figures 1-2 and 3 is clinched over the edge of the inner segment 11 as shown in the enlarged drawing Figure 3 in the process of completing the fish lure 10. The inner segment 11 has two apertures 16—17 as shown in the drawings Figures 1 and 2, one aperture 17 also shown on the perspective view Figure 4 said apertures are located on the longitudinal center line, one said aperture 17 at the head 15 and the second said aperture 16 at the tail 14, as shown on the drawing Figures 1 and 2. The outer segment 12 also has two apertures 28—29 as shown in the drawing Figure 2, said apertures 28—29 are located on the same longitudinal center line and match the apertures 16—17 in the inner segment 11. There is also provided an improved means for securing one or more double or treble fish hooks 24 as indicated in Figures 2 and 4. A wire harness 25 Figures 1-2 and 3 made from stainless steel wire, or the like, formed two loop members 18—19 opposite each other at one end of the harness 25 Figure 2, and two loop members 20—21 opposite each other at the other end of the harness 25 as shown in Figure 2. The longitudinal length of the harness 25 Figure 2 between the loop members 18—19 and 20—21 is the same length as the longitudinal center line length between the transverse apertures 17—28 and transverse apertures 16—29 Figure 2 in the inner and outer segments 11—12. The longitudinally curved wire ends 27 Figure 1 of the harness, are butted at the center line of the harness 25 between the loops 18—19 and 20—21. These wire ends 27 are brazed, or the like to make a strong structure.

The loop members 18—20 of the wire harness 25 are threaded through the apertures 16—17 on the convex surface of the inner segment 11 and loop members 19—21 of the wire harness 25 are threaded through the apertures 28—29 on the concave surface of the outer segment 12.

An insert 30 as shown in Figures 2 and 3 on the drawing may be made of aluminum foil or tin-foil preferably bright color or color combinations or the like, said insert 30 is assembled on the convex surface of the inner segment 11. Another insert 26 as shown in Figures 2 and 3 on the drawing is made of same material as insert 30, is assembled on the concave surface of the outer segment 12.

Said harness 25 is assembled between the two inserts 26—30.

A split ring 31 Figures 1-2 and 4 attached to loop member 18 upwardly projecting from the concave surface of the inner segment 11 at the forward end to which a fishing line or leader 23 is secured, two split rings 22—22 are attached to loop members 19—21 downwardly projecting from the convex surface of the outer segment 12, said loop members 19—21 with split rings 22—22 accommodate conventional fish hooks 24—24 Figures 2 and 4 on the drawing.

Loop member 20 Figure 2 upwardly projecting from the concave surface of the inner segment 11 at the tail 14 end, said loop member 20 used purposely for assembly only.

When said fish lure 10 is cast in the water and as the fish lure 10 is trolled or retrieved, the action is similar to a live fish and the tail 14 causing an agitation or whirlpool effect.

Having thus set forth the nature of my invention I claim:

A fish lure comprising two elongated segments which have an upwardly open convexo-concave cross-sectional shape, said segments being longitudinally curved downward at their ends the sides of the segments tapering toward the rearmost end, the rearmost end having a wall which is upwardly curved, said segments being made of transparent plastic and having uniform thickness throughout, one of said segments constituting an inner segment and being formed to fit into the concave surface of the outer segment, said segments having a pair of aligned transverse openings therein along the central longitudinal axis of said segments, reflecting inserts adapted to be assembled between the inner and outer segments, a continuous flange provided on the edge of the outer segment which is clinched over the edge of the inner segment thereby securing said segments together, a wire harness having a longitudinally curved shank, said harness being provided with two identically formed loops opposite each other disposed at each end of the curved shank, said wire harness being positioned between the segments with said loops inserted through the transverse openings, and fish-hooks connected to the loops extending downwardly through the outer segment.

References Cited in the file of this patent

UNITED STATES PATENTS

| | | |
|---|---|---|
| 2,003,976 | Raymond | June 4, 1935 |
| 2,514,938 | Craig | July 11, 1950 |
| 2,796,693 | Gunterman | June 25, 1957 |